Dec. 7, 1954     S. E. NEWELL     2,696,578
ANTIHUNT MEANS FOR ELECTRIC MOTOR POSITIONING SYSTEMS
Filed Aug. 10, 1953
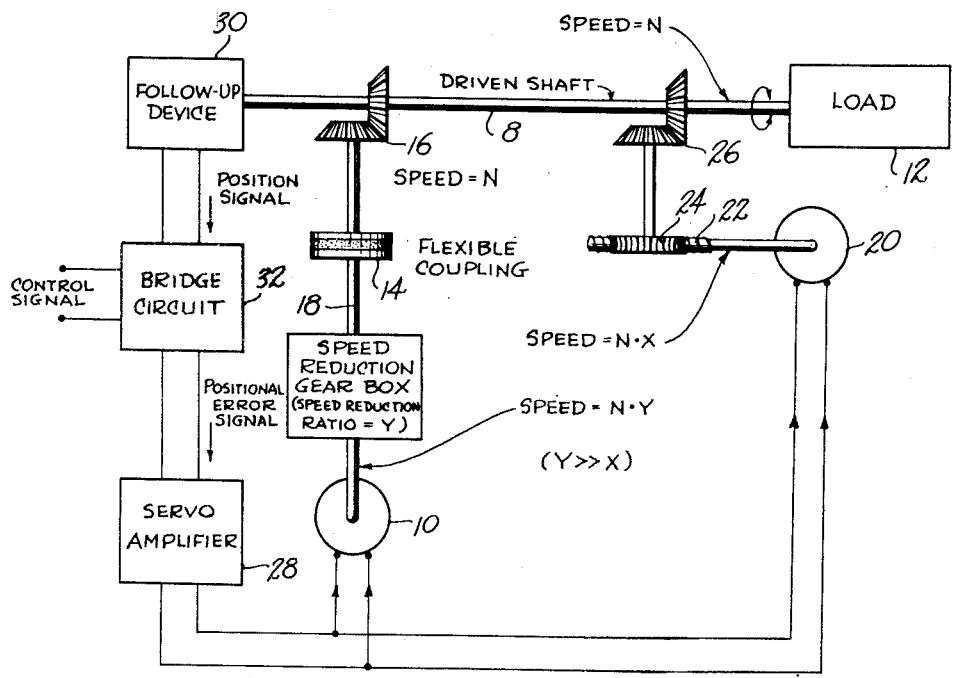
INVENTOR.
STANLEY E. NEWELL
BY
ATTORNEYS United States Patent Office 2,696,578
Patented Dec. 7, 1954

2,696,578

ANTIHUNT MEANS FOR ELECTRIC MOTOR POSITIONING SYSTEMS

Stanley E. Newell, Seattle, Wash., assignor to Boeing Airplane Company, Seattle, Wash., a corporation of Delaware Application August 10, 1953, Serial No. 373,113

11 Claims. (Cl. 318—19)

This invention relates to an improved servo system and has for its general object the achievement of a high performance servomechanism which by a relatively simple means overcomes the long outstanding problem of overshoot and hunting due to momentum effects in servomechanisms generally. The invention is herein illustratively described by reference to its presently preferred form as applied to the control of a driven shaft in accordance with an electric signal, but it will be appreciated the invention may assume varying forms and is not limited to the illustrative details.

In order to rotate a driven shaft to a desired position represented by a control signal such as a circuit voltage within an allowable period of time, it is of course inevitable that a certain amount of momentum will be generated in the motive power means. Because of this momentum some means of damping will be necessary in order to minimize overshoot and hunting of the driven shaft relative to the correct shaft position. In order to hold the positional error below the acceptable maximum such damping requirement normally increases with the capability of the servomechanism to accelerate the driven shaft rapidly, hence in a conventional servomechanism the two requirements of high performance, namely ability to accelerate and decelerate rapidly as required impose conflicting limitations on mechanical design overcome or reconciled only by the provision of damping.

In the usual type of servomechanism damping is accomplished in relatively complex manner. Electrical damping or antihunting circuits present critical design problems and are usually difficult to calibrate or adjust accurately, and if correct for one type of load or set of operating conditions will tend to be in error for others. Moreover such damping circuits have definite limitations even if optimum for a particular case, since to the extent they reduce hunting and instabilities they also tend to reduce the acceleration capacity of the system or its ability to produce rapid positional changes.

The present invention provides a high performance servomechanism which solves the damping problem in relatively simple and inexpensive manner. A related object is a high performance servomechanism having provisions for automatic damping which are not critically related to the operating conditions nor to the nature of the load imposed on the driven shaft.

Still another object of the present invention is a high performance servomechanism which substantially eliminates the problem of overshoot and hunting of the driven shaft due to momentum effects without impairing the response sensitivity, i. e. the ability of the servomechanism to respond quickly to positional error signals calling for sudden changes of shaft position, large or small.

Described in brief terms, the foregoing and other objectives are accomplished by applying drive power to the driven shaft through a flexible coupling permitting the primary drive motor to overrun the shaft when the latter is braked, and by providing a secondary drive motor of very low momentum relative to the primary drive motor drivingly connected to the driven shaft through a unilateral transmission means, the preferred form of which comprises a worm and gear drive. In the example, the worm gear is drivingly connected to the driven shaft while the worm is driven by the second motor. Both motors are energized simultaneously in accordance with the positional error signal, and whereas the main drive motor provides most of the drive torque and in so doing generates a relatively large amount of momentum, the second drive motor generates very little momentum and need generate only sufficient torque to cause the worm to follow the position of the driven shaft. Hence when energization of the two motors drops off or terminates as the driven shaft approaches and reaches the desired control position the secondary motor stops almost instantaneously. Since the worm stops rotating, because of the unilateral character of a worm and gear drive, the driven shaft is thereby instantaneously braked. Momentum of the main drive motor is absorbed or dissipated in the flexible coupling and does not cause the driven shaft to overshoot the correct position. Because of the reversibility of a worm and gear transmission the servomechanism may of course be made reversible with the same high degree of performance in either direction of rotation.

The damping section thus achieved is not at all critical of design nor adjustment. Moreover the action of the brake means comprising the secondary motor and the worm and gear drive permits incorporating virtually any amount of torque and acceleration ability in the primary motive power source without attendant loss of performance due to attendant momentum effects, and provides a damping action which is effective under an extremely wide range of operating conditions.

These and other features, objects and advantages of the invention including certain details of the preferred embodiment thereof herein disclosed will become more fully evident from the following description by reference to the accompanying drawing.

The single figure constitutes a schematic diagram of an electrical form of the servomechanism incorporating the invention.

The driven member comprises a shaft 8 connected to a load 12, the nature of which is here unimportant. The drive means by which this shaft is rotated comprises the primary electric drive motor 10. This motor is drivingly connected to shaft 8 through speed reduction gearing 12 and a flexible coupling 14 interposed between the gear box and the bevel gears 16, the latter forming a drive connection between the gear box output shaft 18 and the driven shaft 8 as illustrated. The flexible coupling may be of any suitable type including a torsion coupling incorporating a rubber or metal spring torsion element, for instance, a slipping clutch, or any other suitable device permitting the driven shaft to be overrun by the shaft 18 when the driven shaft is braked. If the servomechanism is to be reversible, as is usually the case, the flexible coupling must also be reversible. The flexible coupling should be capable of absorbing or dissipating the kinetic energy of the rapidly rotating motor 10 acting through the speed reduction gearing 12. Preferably it should bring the drive motor 10 to a stop as quickly as possible preparatory to reverse drive rotation if required.

The servomechanism additionally comprises brake means including a secondary electric motor 20 drivingly connected to the driven shaft 8 through the worm 22 and the cooperating worm gear 24. The worm is rotated directly by the motor 20 at a speed which preferably is low relative to the speed of motor 10. The worm gear 24 is connected to the driven shaft through the bevel gearing 26. In a typical case the speed reduction ratio of the work and gear may be of the order of ten, generalized by the letter "X" in the figure. In a typical case the speed reduction ratio of the gear box 12 may be of the order of 600, and in the drawings is generalized by the letter "Y." Thus in this example the motor 10 rotates at 60 times the speed of the motor 20 so that, other things being equal, the kinetic energy or momentum generated by the secondary drive motor 20 will be only 1/3600 that generated by the primary drive motor 10.

Actually the motors may be of different sizes and inertias and the relative inertia values of the speed reduction gearing 12 and the worm and gear transmission 22, 24 may also differ considerably, so that the foregoing ratio of momentum or kinetic energy values may vary. The important consideration, however, is to provide a very low momentum motivating means such as the electric motor 20 for rotating the worm 22 in a direction and at a speed corresponding to that of the driven shaft as produced by the primary drive motor 10, so that under conditions of maximum required acceleration and continued rotation of the driven shaft the worm and gear combination will not impede or stop driven shaft rotation. However, because of the relatively low momentum generated by the motor 20 in accomplishing the foregoing result, it is capable of stopping quickly when energization is removed therefrom. Thus by energizing both the motors 10 and 12 simultaneously in accordance with the same control signal both tend to drive the driven shaft 8, the motor 10 providing most of the torque, as long as the shaft position requires changing, whereas when no further change is required and the motors are deenergized, the motor 20 coasts to an immediate halt and the driven shaft is thereby braked, preventing overshoot. The existing momentum of the primary drive motor at that instant is absorbed or dissipated by the flexible coupling 14.

The complete servomechanism as illustrated in the figure additionally comprises a follow-up device 30, such as a potentiometer producing an electrical signal representing the existing position of the driven shaft 8, and a bridge or voltage comparison circuit 32 into which this position signal is fed. This bridge circuit also receives the control signal representing the positional requirements of the driven shaft. The algebraic difference between these two signals constitutes a positional error signal fed from the bridge circuit 32 to the servoamplifier 28 controlling energization of the motors 10 and 20. The phase or polarity of the amplifier output voltage produces energization of the motors 10 and 20 tending at all times to reduce the positional error signal to zero by repositioning of the follow-up device.

It will be apparent to those skilled in the art that the invention thereby provides a novel and improved means for overcoming the damping problem in a servomechanism capable of generating high torque at high speed if required, and that this result is accomplished by the incorporation of special brake means acting on the driven shaft and characterized by a second drive motor drivingly connected to this shaft through a unilateral transmission device, the preferred form of which is a worm and gear drive. The invention is further characterized in that the drive motor incorporated in such brake means has a relatively low momentum so that it tends to stop quickly, hence brake the shaft automatically thereby, when the positional error signal has been reduced to substantially zero, even though the kinetic energy present in the main drive motive power means is still relatively large. The further feature of means permitting dissipation of this relatively large amount of kinetic energy without disturbing the correctly attained position of the driven shaft constitutes a further feature of the improved device.

In actual practice it is found that this improved and simplified servomechanism performs with less error and with greater stability than much more complex critically damped servo systems of conventional or known design.

An additional advantage possessed by the improved servo system is the positive lock applied to the driven shaft by the unilateral action of the worm gear drive 22, 24 during periods of nonoperation of the servomechanism.

I claim as my invention:

1. Servomechanism comprising a driven member, a first drive motor, means drivingly connecting said motor to said member including flexible coupling means permitting overrunning of said member by said motor when said driven member is braked, brake means comprising a second drive motor and unilateral drive means drivingly connecting said second motor to said driven member, said unilateral drive means automatically preventing overrunning of said second motor by said driven member when said second motor decelerates, whereby said driven member is braked, and motor control means common to said first and second drive motors producing simultaneous energization thereof for moving said driven member, the motivating force applied to said driven member by said first drive motor being high in relation to that applied by said second drive motor, and the drive momentum of said first drive motor being high in relation to that of said second drive motor, whereby said second drive motor stops more abruptly than said first drive motor following termination of such energization and thereby causes braking of said driven member before said first drive motor can stop.

2. The servomechanism defined in claim 1, wherein the unilateral drive means comprises a worm and gear drive including a worm gear drivingly connected to the driven member and a cooperating worm driven by the second drive motor.

3. Servomechanism comprising a driven member, a first drive motor, means drivingly connecting said first drive motor to said driven member including speed reduction means producing slower movement of said driven member than that produced by said motor, and further including flexible coupling means interposed in such drive connection between said driven member and said speed reduction means permitting overrunning of said driven member by said first drive motor when said driven member is braked, brake means comprising a second drive motor and unilateral drive means drivingly connecting said second drive motor to said driven member, said unilateral drive means preventing overrunning of said second drive motor by said driven member when said second drive motor decelerates, whereby said driven member is braked, and motor control means common to said first and second drive motors producing simultaneous energization thereof for moving said driven member, the motivating force applied to said driven member by said first drive motor through said speed reduction means being high in relation to that applied by said second drive motor through said unilateral drive means, and the drive momentum of said first drive motor being high in relation to that of said second drive motor, whereby said second drive motor stops more abruptly than said first drive motor following termination of energization of both motors, and thereby causes braking of said driven shaft before said first drive motor can stop.

4. The servomechanism defined in claim 3, wherein the unilateral drive means comprises a worm and gear drive including a worm gear drivingly connected to the driven member and a cooperating worm driven by the second drive motor.

5. Servomechanism comprising in combination a driven shaft, a first motive power means drivingly connected to said shaft and operable at relatively high momentum to apply relatively high torque to said shaft, a second motive power means drivingly connected to said shaft and operable at relatively low momentum to apply torque to said shaft, unilateral drive transmission means interposed in the drive connection between said shaft and second motive power means preventing rotation of the latter by said shaft, flexible coupling means interposed in the drive connection between said shaft and said first motive power means permitting overrunning of said shaft by said first motive power means when the shaft is braked, means for simultaneously energizing said first and second motive power means to vary the rotational position of said shaft.

6. The servomechanism defined in claim 5, wherein the unilateral drive transmission means comprises a worm gear drive including a worm gear drivingly connected to said shaft and a cooperating worm driven by the second motive power means.

7. The servomechanism defined in claim 5, wherein the first motive power means comprises a motor rotatable at relatively high speed when energized for rotating the shaft, and speed reduction means interposed in the first drive connection between said motor and the flexible coupling means.

8. The servomechanism defined in claim 5, wherein the first motive power means comprises a motor rotatable at relatively high speed when energized for rotating the shaft, and speed reduction means interposed in the first drive connection between said motor and the flexible coupling means, and wherein the unilateral drive transmission means comprises a worm gear drive including a worm gear drivingly connected to said shaft and a cooperating worm driven by the second motive power means.

9. Servomechanism comprising a driven shaft, drive means including an electric motor, speed reduction means driven by said motor and having an output shaft, and flexible coupling means drivingly connecting said output shaft to said driven shaft, said flexible coupling means permitting overrunning of said driven shaft by said motor and speed reduction means when said driven shaft is braked, brake means comprising a second electric motor and worm gear transmission means drivingly connecting said second electric motor to said driven shaft, said second electric motor being energizable to rotate at relatively low speed and applying low torque to said driven shaft relative to the torque applied thereto by said drive means, said worm gear transmission means including a worm gear drivingly connected to said driven shaft and a worm rotated by said second electric motor, and electric circuit means arranged for energizing both of said electric motors simultaneously for rotating said driven shaft, said electric circuit means including a follow-up device mechanically operated by said driven shaft and producing shaft position signals, means for application of control signals to said circuit, and means producing positional error signals representing the difference between said position signals and control signals for controlling energization of said electric motors.

10. Servomechanism comprising a driven shaft, drive means including an electric motor and flexible coupling means drivingly connecting said motor to said driven shaft, said drive means being capable of rotating said driven shaft with relatively high torque and of developing relatively high kinetic energy, and said flexible coupling means permitting overrunning of said driven shaft by said motor when said driven shaft is braked, brake means comprising a second electric motor and worm gear transmission means drivingly connecting said second electric motor to said driven shaft, said second electric motor being capable of applying only relatively small torque to said driven shaft and of developing only relatively low kinetic energy, said worm gear transmission means including a worm gear drivingly connected to said driven shaft and a worm rotated by said second electric motor, and electric circuit means arranged for energizing both of said electric motors simultaneously for rotating said driven shaft, said electric circuit means including a follow-up device mechanically operated by said driven shaft and producing shaft position signals, means for application of control signals to said circuit, and means producing positional error signals representing the difference between said position signals and control signals for controlling energization of said electric motors.

11. Servomechanism comprising a driven shaft, drive means including an electric motor and flexible coupling means drivingly connecting said motor to said driven shaft, said drive means being capable of rotating said driven shaft with relatively high torque and of developing relatively high kinetic energy, and said flexible coupling means permitting overrunning of said driven shaft by said motor when said driven shaft is braked, brake means comprising a second electric motor and unilateral transmission means drivingly connecting said second electric motor to said driven shaft, said second electric motor being capable of applying only relatively small torque to said driven shaft and of developing only relatively low kinetic energy, said unilateral transmission means automatically preventing overrunning of said second motor by said driven shaft when said second motor decelerates, and electric circuit means arranged for energizing both of said electric motors simultaneously for rotating said driven shaft, said electric circuit means including a follow-up device mechanically operated by said driven shaft and producing shaft position signals, means for application of control signals to said circuit, and means producing positional error signals representing the difference between said position signals and control signals for controlling energization of said electric motors.

No references cited.